(12) United States Patent
Pierides

(10) Patent No.: US 12,213,404 B2
(45) Date of Patent: Feb. 4, 2025

(54) METAL ROD BLADE AND TRIMMER HEAD UTILIZING SAME

(71) Applicant: Alexis M. Pierides, Strovolos (CY)

(72) Inventor: Alexis M. Pierides, Strovolos (CY)

( * ) Notice: Subject to any disclaimer, the term of this patent is extended or adjusted under 35 U.S.C. 154(b) by 0 days.

(21) Appl. No.: 18/692,231

(22) PCT Filed: May 5, 2022

(86) PCT No.: PCT/US2022/027800
§ 371 (c)(1),
(2) Date: Mar. 14, 2024

(87) PCT Pub. No.: WO2023/043499
PCT Pub. Date: Mar. 23, 2023

(65) Prior Publication Data
US 2024/0415053 A1   Dec. 19, 2024

Related U.S. Application Data

(60) Provisional application No. 63/243,746, filed on Sep. 14, 2021.

(51) Int. Cl.
*A01D 34/73* (2006.01)
*A01D 101/00* (2006.01)

(52) U.S. Cl.
CPC .......... *A01D 34/73* (2013.01); *A01D 2101/00* (2013.01)

(58) Field of Classification Search
CPC ..................................................... A01D 34/73
See application file for complete search history.

(56) References Cited

U.S. PATENT DOCUMENTS 2,663,137 A * 12/1953 Asbury .............. A01D 34/4168
125/36
4,062,114 A * 12/1977 Luick ................. A01D 34/4168
30/276

(Continued)

FOREIGN PATENT DOCUMENTS

WO      2023043499 A1     3/2023

OTHER PUBLICATIONS

ISA/US, Commissioner for Patents, International Search Report, International Application No. PCT/US22/7800, Mailed Jul. 28, 2022, 2 Pages.

(Continued)

*Primary Examiner* — Sean M Michalski
(74) *Attorney, Agent, or Firm* — Ziegler IP Law Group LLC.

(57) ABSTRACT

A grass trimmer head has a trimmer head assembly and a metal-rod blade assembly. The blade assembly is characterized by a length of solid metal-rod, and a spherical portion, attached to one end. The head assembly is made of an inverted metal cup with a plurality of spherical cavities or sockets, placed equidistantly around the internal vertical wall and penetrating the outside wall, creating a predominantly circular opening. The blade assemblies are inserted into the cavities, snapping into place and held loosely by a spring-loaded retainer, for easy removal or replacement. The ball joint formed allows the blade assembly to rotate freely in all directions. Each external opening is extended on the trailing side with a cavity allowing the blade assembly to rotate at higher angles in the trailing and upward directions.

15 Claims, 7 Drawing Sheets

(56) References Cited

U.S. PATENT DOCUMENTS

| | | | | |
|---|---|---|---|---|
| 4,136,446 A | | 1/1979 | Tripp | |
| 4,199,926 A | * | 4/1980 | Petty | A01D 34/416 56/127 |
| 4,290,200 A | * | 9/1981 | Lombard | A01D 34/4162 30/276 |
| 5,622,035 A | * | 4/1997 | Kondo | A01D 34/736 56/DIG. 17 |
| 5,758,424 A | * | 6/1998 | Iacona | A01D 34/4166 30/276 |
| 6,519,857 B1 | * | 2/2003 | Proulx | A01D 34/416 30/276 |
| 6,842,984 B1 | * | 1/2005 | Grant | A01D 34/4168 30/276 |
| 6,944,956 B1 | * | 9/2005 | Fogle | A01D 34/4166 30/276 |
| 8,001,694 B2 | * | 8/2011 | Sing | A01D 34/4166 30/276 |
| 8,307,558 B2 | * | 11/2012 | Alliss | A01D 34/4166 30/276 |
| 11,252,866 B1 | * | 2/2022 | Lang | A01D 34/4166 |
| 2001/0003935 A1 | * | 6/2001 | Morabit | B29C 53/14 83/13 |
| 2006/0026846 A1 | * | 2/2006 | Alliss | A01D 34/416 30/276 |
| 2009/0260237 A1 | * | 10/2009 | Alliss | A01D 34/4162 30/276 |
| 2010/0083506 A1 | * | 4/2010 | Bennett | A01D 34/4168 30/122 |
| 2010/0154228 A1 | * | 6/2010 | Watts | A01D 34/4166 29/428 |
| 2015/0216122 A1 | * | 8/2015 | Jerez | A01D 34/4166 30/276 |
| 2015/0245558 A1 | * | 9/2015 | Morabit | A01D 34/4165 29/401.1 |
| 2015/0264862 A1 | | 9/2015 | Skinner | |
| 2018/0199507 A1 | * | 7/2018 | Nevels | A01D 34/4166 |
| 2023/0200293 A1 | * | 6/2023 | Alliss | A01D 34/4166 83/13 |

OTHER PUBLICATIONS

SA/US, Commissioner for Patents, Notification of Transmittal of the International Search Report and the Written Opinion of the International Searching Authority, or the Declaration, International Application No. PCT/US22/7800, Mailed Jul. 28, 2022, 1 Page.

The International Bureau of WIPO, International Preliminary Report on Patentability and Written Opinion of the International Seaching Authority, International Application No. PCT/US22/7800, Mailed Mar. 5, 2024, 5 Pages.

* cited by examiner

METAL ROD BLADE AND TRIMMER HEAD UTILIZING SAME

CROSS-REFERENCE TO RELATED APPLICATIONS

This application is a non-provisional of U.S. application 63/243,746, filed on 14 Sep. 2021, which is incorporated by reference as if fully recited herein.

TECHNICAL FIELD

The present invention relates to grass or brush trimmer device comprising a trimmer head and a metal rod blade assembly. The grass trimmer head assembly comprises an inverted grass metal cup head with a plurality of spherical or conical cavities, or sockets, machined equidistantly around the internal vertical annular wall of the head and partially reaching the outside vertical wall, penetrating it and creating a predominantly circular opening, and in which cavities the metal rod blade assembly is inserted from the inside-out, snapping into place, and able to be released and replaced at will, creating a universal ball joint and allowing the metal rod blade assembly to rotate freely about its spherical portion, in all three rotational directions while being retained therein. Each circular opening on the outside annular vertical wall of the grass trimmer head cup is extended on the trailing side by a cavity that allows the metal rod blade assembly to rotate at higher angles in the trailing and upward directions of a rotating trimmer head. The metal rod blade assembly is characterized by a length of bare, plated or galvanized, solid metal rod, or any cross-sectional shape, straight or twisted, and a spherical retaining portion attached to one end of the metal rod, creating the root of the blade assembly, for retaining the metal rod blade assembly on the grass trimmer head assembly. The spherical portions of the metal rod blade assemblies are loosely held on the inside of the grass trimmer head by one or more spring-loaded retainers, preventing the spherical portion of the blade from sliding inwards and down, or falling off the trimmer head assembly while in operation.

BACKGROUND ART

The invention is developed to replace two older technologies, flexible Nylon string grass trimming head devices and solid metal disk-blade type brush cutting devices for use on household level machines, all the way up to large professional-landscaper level machines.

Nylon string and solid blade trimmers are very successful technologies but have several drawbacks such as the inability of string trimmers to cut cleanly large diameter brush of approximately more than 12 mm, and of solid blade cutters' inability to cut thin grass evenly and precisely, since thin grass tents to partially bend out of the way of such cutters.

The use of a solid metal rod as a cutting medium, not only allows for faster cutting, but eliminates the need for use of a separate solid, disk-like metal blade for stronger brush, since the metal-rod blades cut such brush with ease while able to also cut thin grass as effectively and as precisely as Nylon or plastic string trimmer head devices.

Another major problem of string trimmers is the severe pollution they create due to the plastic nanoparticles they introduce to the environment instantly upon disintegration of the Nylon or plastic string while wearing out in use.

The current invention uses a far faster environmentally degradable material that is oxidized in nature and does not pollute the environment with toxic residues.

The string-trimmer rewinding process is a dirty and labor intensive process the user has to go through every time the string is worn out. Nylon or plastic string trimmers further complicate the process by forcing the trimmer machine to work most of the time out of its optimal conditions, since the string starts too long when first released, forcing the trimmer head to turn too slow and imposing high torque to the engine, then quickly passes through an optimum length as the string is worn out during grass cutting, to immediately after become too short and lead to the engine overspinning at higher than normal rotational speeds.

Such problems led to the need for single use string blades, that can work the entire time of their service-life in optimum length until failure and replacement, without wearing out.

Improving on the cutting efficiency of previous systems and critical for the invention to work with a solid metal rod of various shapes as cutting medium, is the material of the metal rod which is, but not limited to: spring-steel or piano-wire of the A228 families, or similar European or Japanese family denominations, such as EN 10270-1, SWP-A, SWP-B or other treated steels especially designed for spring applications.

SUMMARY

In accordance with the present invention, there is provided a grass or brush trimmer head device comprising a trimmer head assembly wherein the trimmer head assembly comprises an inverted metal cup with a plurality of spherical or conical cavities or sockets, machined equidistantly around the internal vertical annular wall of the head and partially reaching the outside vertical wall, penetrating it and creating a predominantly circular opening, and in which cavities the metal rod blade assembly is inserted from the inside-out, snapping into place and able to be released and replaced at will, creating a universal ball-joint and allowing the metal rod blade assembly to rotate about its spherical portion freely in all three rotational directions while being retained therein. Each circular opening on the outside annular vertical wall of the grass trimmer head cup is extended on the trailing side by a cavity that allows the metal rod blade assembly to rotate at higher angles in the trailing and upward directions of a rotating trimmer head.

The metal rod blade assembly is characterized by a length of bare solid metal rod of any cross-sectional shape, straight or twisted, made out of spring steel material such as piano-wire A228, and a spherical retaining portion, attached to the root portion of the metal rod for retaining the metal rod blade assembly in the grass trimmer head, slightly smaller in diameter than the spherical cavity or socket in the inside of the metal head cup, but larger than the circular opening on the outside wall of the trimmer head created by the spherical cavity on the inside of the metal head cup. The metal rod blades are held loosely on the inside of the grass trimmer head in the machined spherical cavities by one or more spring-loaded retainers, preventing the spherical portion of the blade from sliding inwards and down, or falling off the trimmer head assembly while in operation.

The retaining portion may be a spherical ball which receives the solid metal rod, and in particular one end of the solid metal rod. Also, the retaining spherical portion of the blade may be integral to the blade, such as when formed simultaneously with the metal rod by stamping or molding, or when the spherical ball is attached by over-molding to one end of the metal rod.

BRIEF DESCRIPTION OF THE DRAWINGS

A better understanding of the present invention will be obtained by a review of the following written description and the accompanying drawings, wherein identical parts are identified with identical reference number and wherein.

DETAILED DESCRIPTION OF A PREFERRED EMBODIMENT

Figure 1:
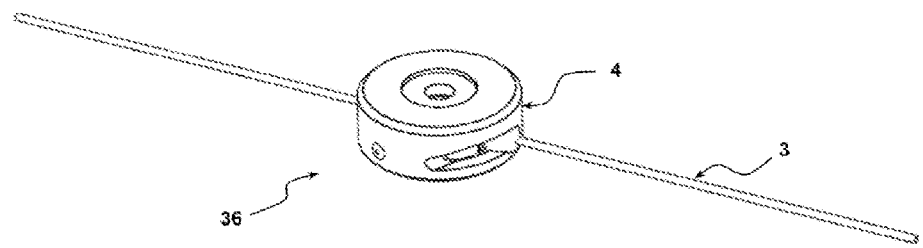
FIG. 1 is a top-right perspective view of an assembled trimmer head incorporating the inventive concept.

FIGS. 1 to 16 depict various aspects of a new grass and brush trimmer head device embodying the principles and concepts of an embodiment of the disclosure and generally designated by the reference numeral (36) are disclosed.

FIG. 1 is a top-right perspective view of an assembled trimmer head incorporating the inventive concept, comprising the grass trimmer head assembly (4) and the blade assembly (3).

Figure 2:
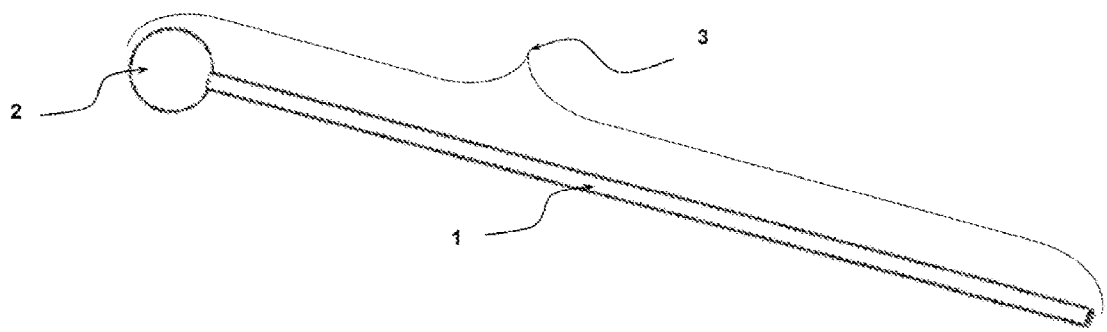
FIG. 2 is an enlarged top-right perspective view of a blade assembly of the trimmer head in isolation.

FIG. 2 is a top-right perspective illustration of the blade assembly (3) comprising a metal rod of any cross-sectional shape, straight or twisted, here shown round and untwisted or straight (1) and a spherical attachment (2) at one end of it made of metal, ceramic or PTFE at the root (3) acting as the retainer of the blade to the grass trimmer head assembly (4).

Figure 3:
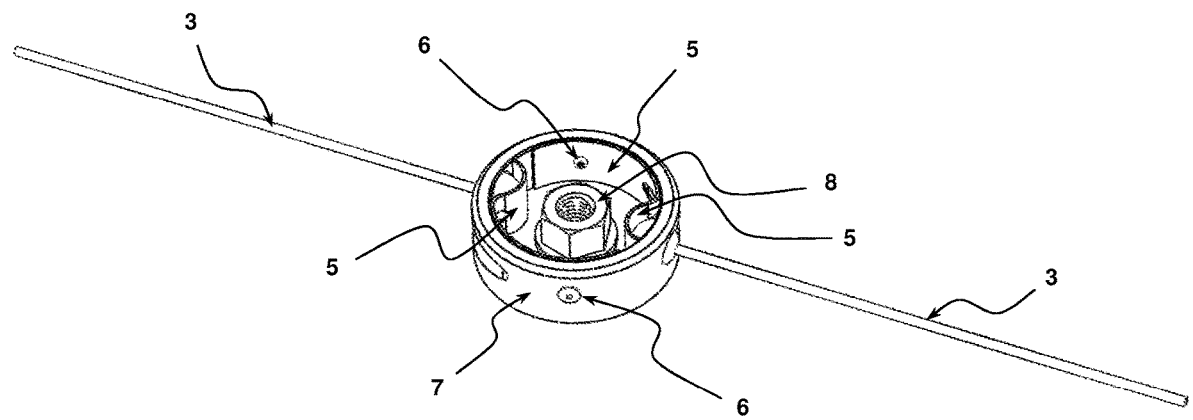
FIG. 3 is a bottom-right perspective view of the FIG. 1 embodiment.

FIG. 3 is a bottom-right perspective illustration of the grass trimmer head device (36) comprising the grass trimmer head cup (7), spring-loaded blade retainers (5), rivets (6) fastening the spring-loaded blade retainers (5) on the grass trimmer head cup (7), blade assemblies (3), and a retainer nut representing the trimming machine's original trim-head retaining nut.

Figure 4:
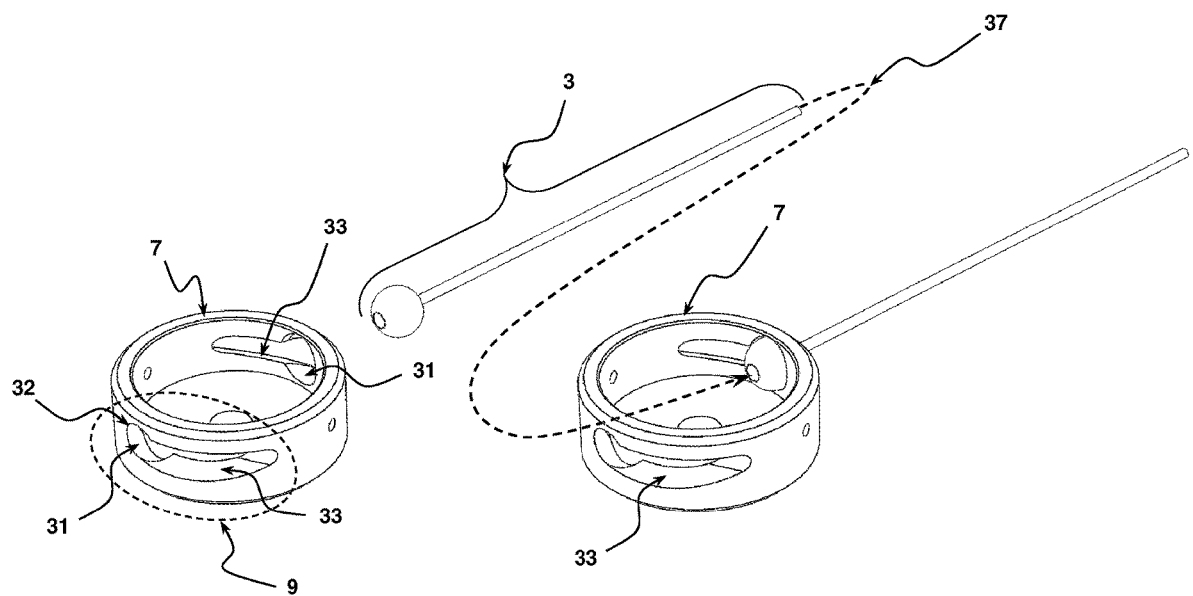
FIG. 4 is a bottom-right perspective illustration of the FIG. 1 embodiment, showing the insertion of the blade assembly into the trimmer head.

FIG. 4 is a bottom-right perspective illustration of the grass trimmer head cup (7), the blade receptacle cavity or socket (9) comprising the machined spherical or conical cavities (31) on the internal annular wall of the grass trimmer head cup (7), the predominantly circular openings (32) of the machined spherical cavities on the outer wall of the grass trimmer head cup (7), and the machined cavities (33) on the outer wall of the grass trimmer head cup (7) that allow the metal rod blades to rotate at higher angles in the trailing and upward directions for a rotating trimmer head, and the metal rod blade assembly (3) being inserted from the inside-out (37) in the grass trimmer head cup (7).

Figure 5:
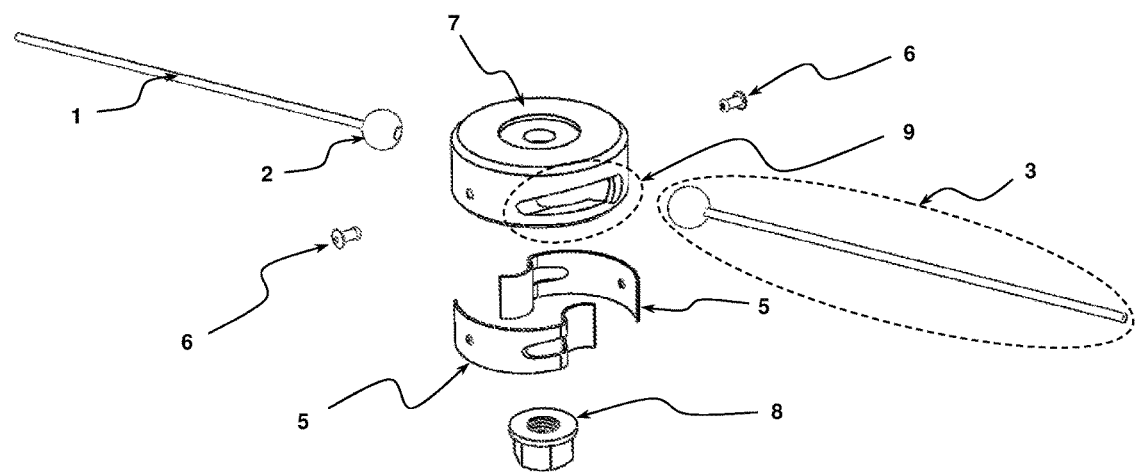
FIG. 5 is an exploded top view of the FIG. 1 embodiment.

FIG. 5 is a top-right exploded-view perspective illustration of the grass trimmer head assembly (4) and blade assembly (3). Here, the blade receptacle cavity (9), the spring-loaded blade retainers (5), rivets (6), and a retainer nut (8) are visible.

Figure 6:
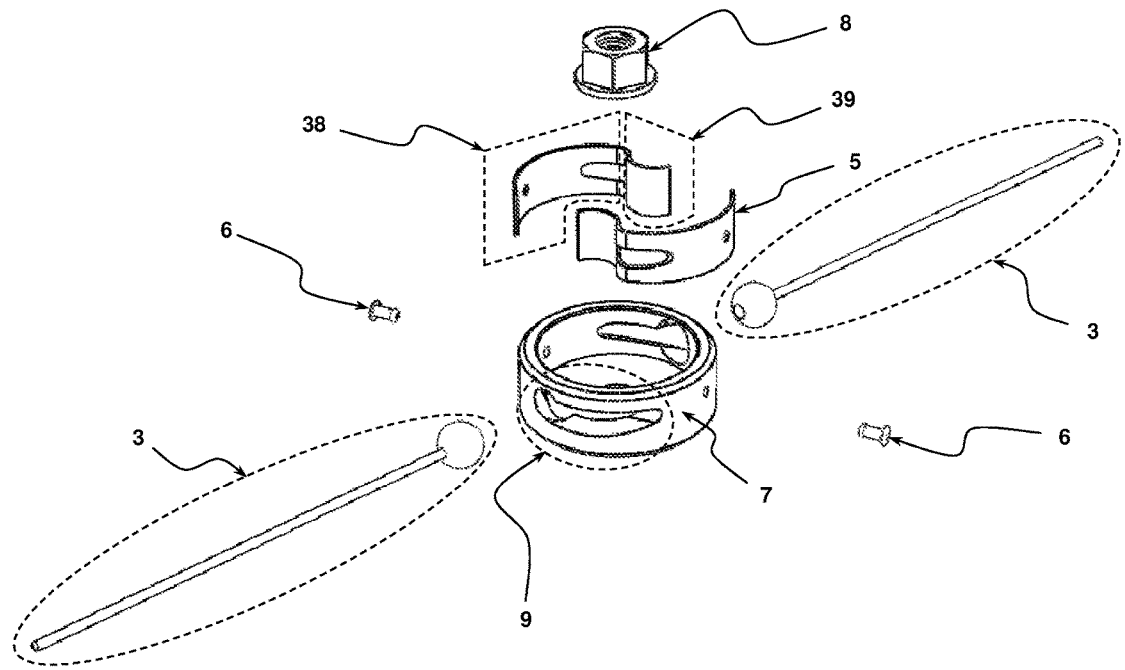
FIG. 6 is an exploded bottom view of the FIG. 1 embodiment.
Figure 7:
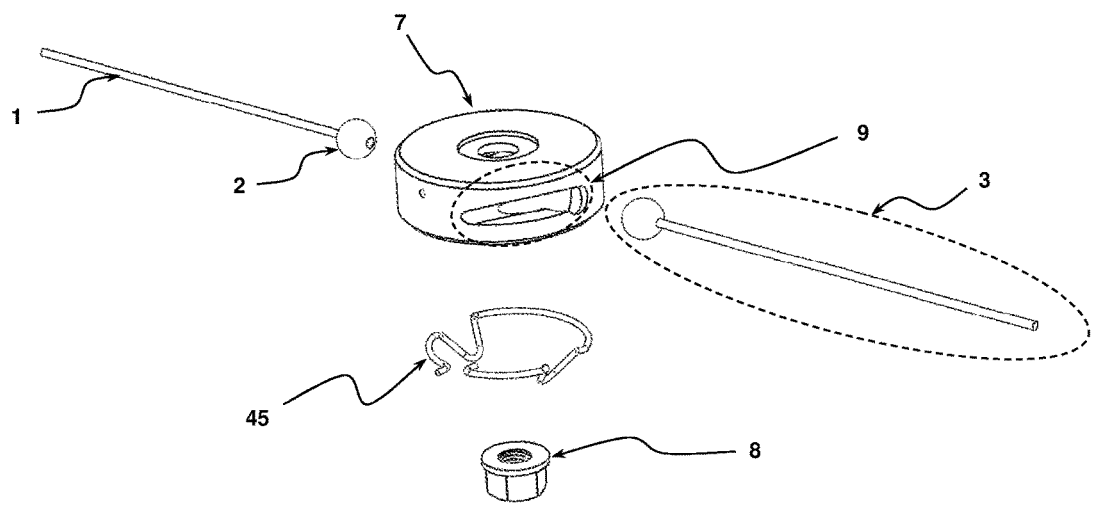
FIG. 7 is an exploded top perspective view of the FIG. 1 embodiment with an alternate retainer.

FIG. 6 is a bottom-right exploded-view perspective illustration of the grass trimmer head device (36) comprising the grass trimmer head cup (7) blade assemblies (3), the blade receptacle cavity (9), the spring-loaded blade retainers (5), rivets (6), and a retainer nut (8).

FIG. 0.7 is a top-right exploded-view perspective illustration of the grass trimmer head assembly (4) and blade assembly (3), the blade receptacle cavity (9), an alternative version of a single spring loaded retainer (45) instead of the two-set of retainers (5), and a retainer nut (8).

Figure 8:
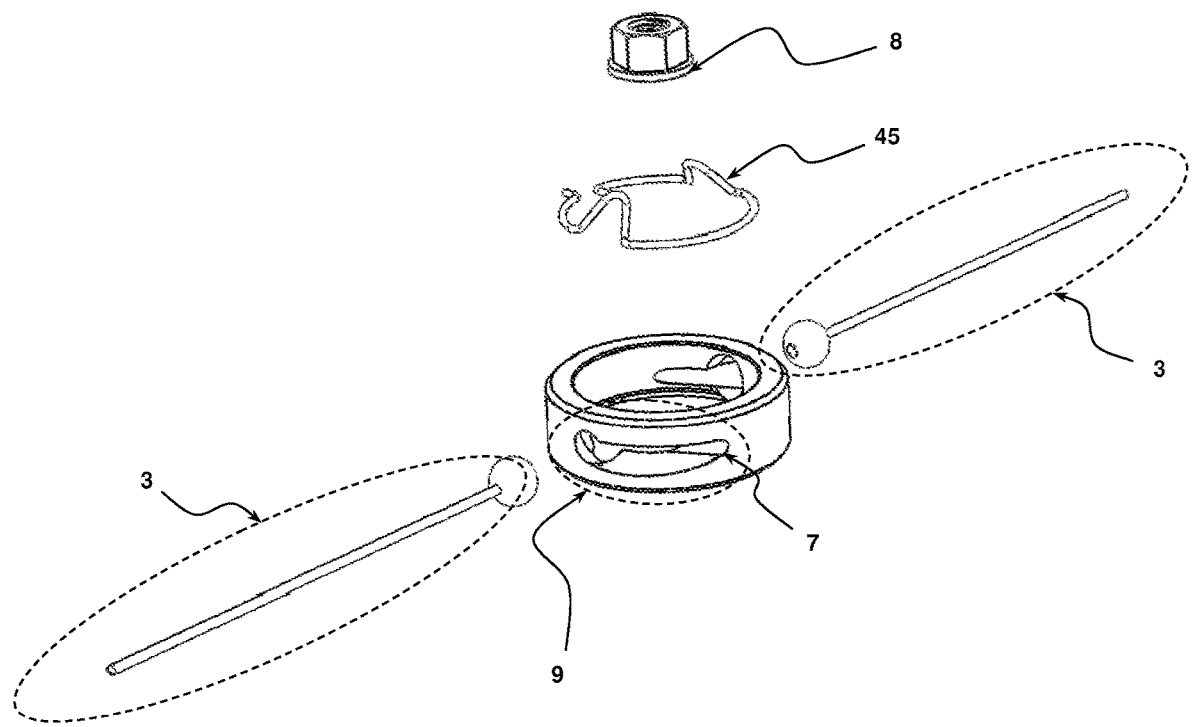
FIG. 8 is an exploded bottom perspective view of the FIG. 7 embodiment.

FIG. 8 shows this same embodiment in a bottom-right exploded-view perspective illustration.

Figure 9:
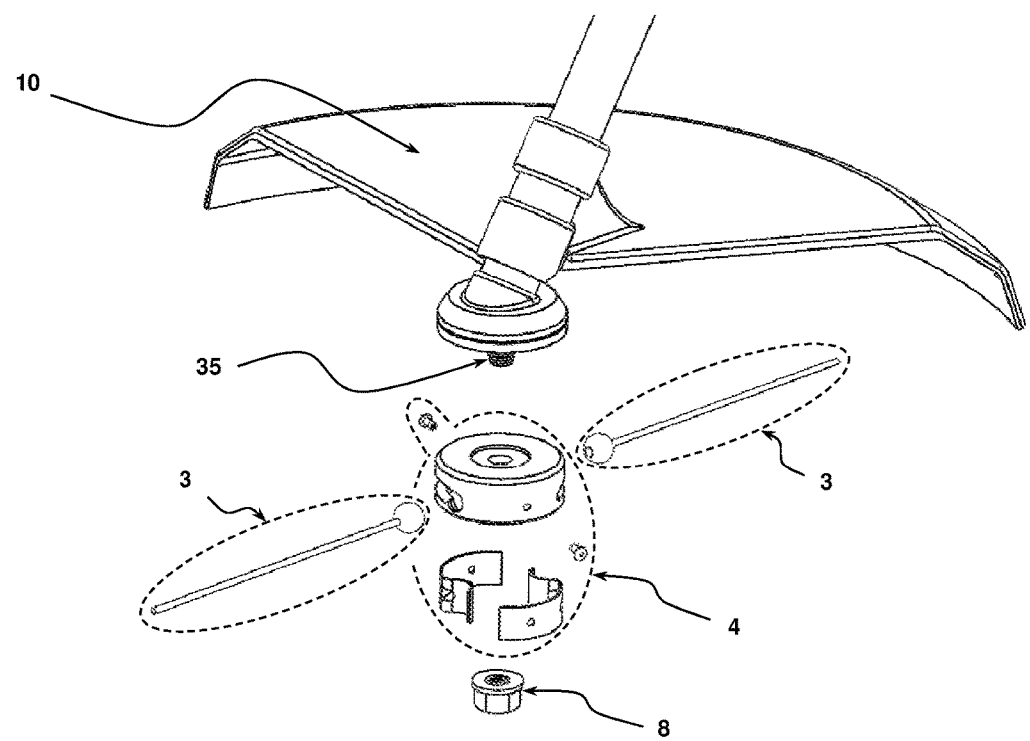
FIG. 9 is an exploded view of the FIG. 1 embodiment in association with a grass trimmer body.
Figure 10:
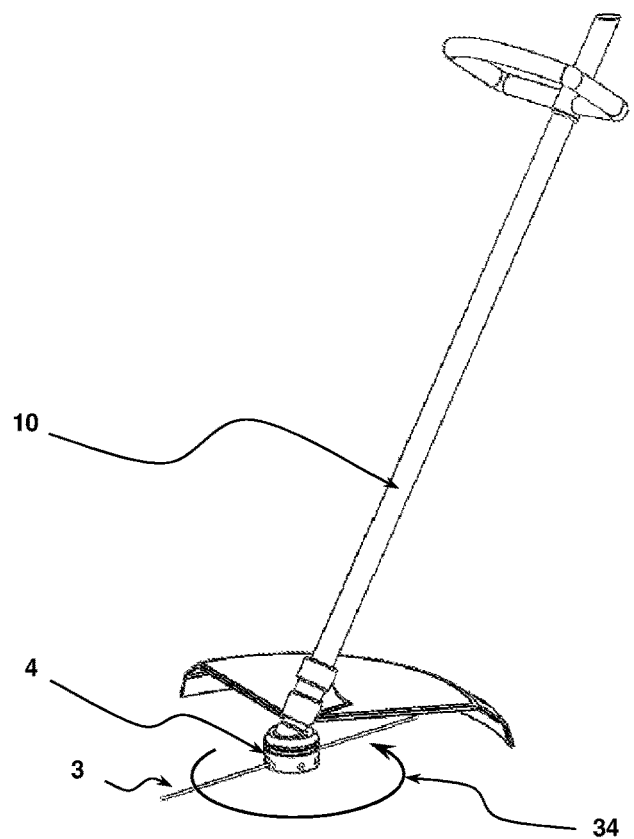
FIG. 10 is an assembled view of the FIG. 1 embodiment in association with a grass trimmer body.

FIG. 9 is a top-right perspective view of the lower part of a generic hand-held and controlled grass trimmer (10), with the grass trimmer's retainer nut (8) the grass trimmer's threaded shaft (35), and a top-right exploded-view perspective of the grass trimmer head assembly (4) and blade assembly (3) as they are positioned before assembling and fastening on the grass-trimmer (10), while FIG. 10 shows this same device in an assembled condition. The counter-clockwise direction (34) that is intended for this embodiment of the invention while in operation is shown.

Figure 11:
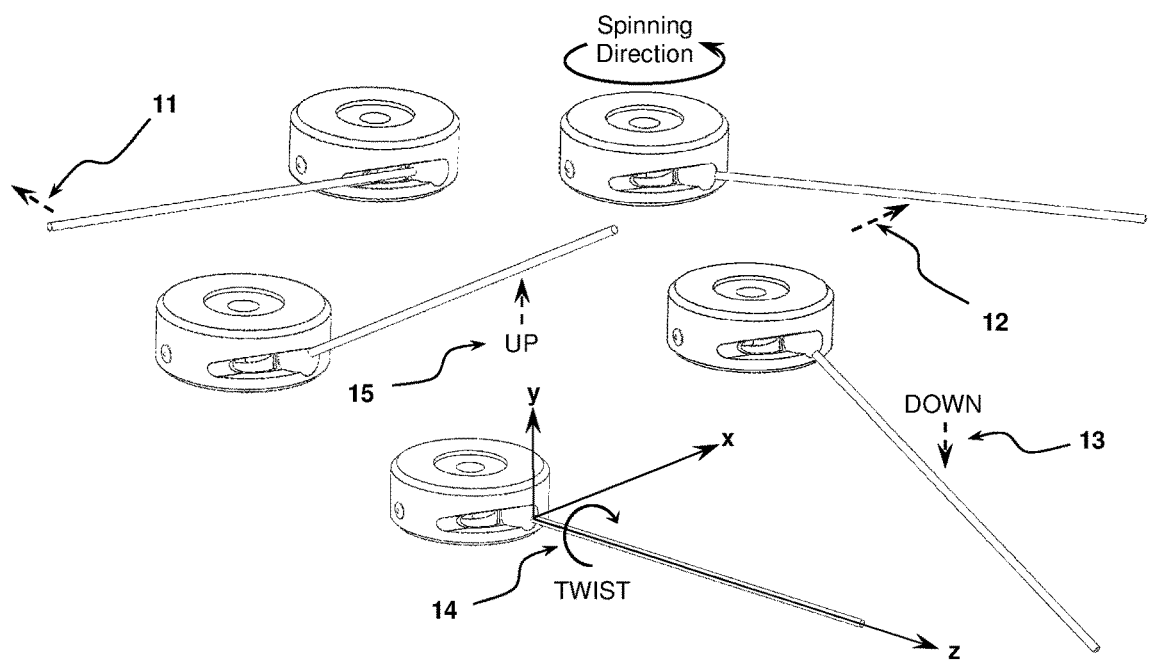
FIG. 11 depicts the trimmer head and blade assembly retained on it in a ball-joint manner, in various aspects of the rotational freedom permitted by the inventive concept.

FIG. 11 is a top-right perspective illustration of the grass trimmer head assembly (4) with one blade assembly (3) at several critical positions the blade assembly goes through during operation, with the unlimited rotational freedom in Axial Rotation/[+/−M(z)] (14), the greatest rotational deflection to the rear/[−M(y)] (11), the second greatest rotational deflection area up [−M(x)] (15), and the rotational deflections to the front/[+M(y)] (12) and down/[+M(x)] (13).

Figure 12:
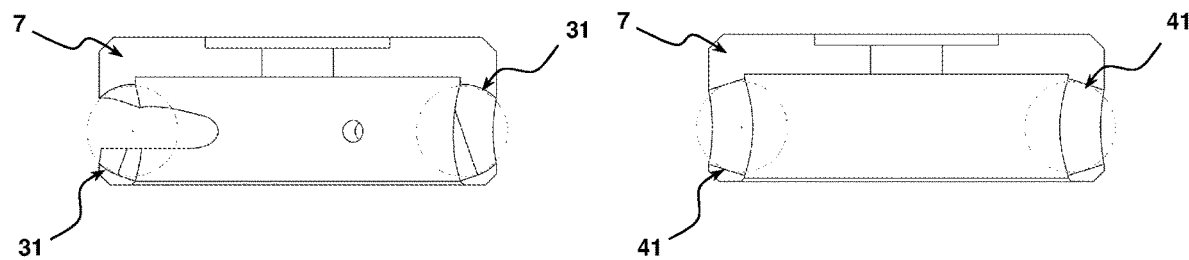
FIG. 12 is a side section view of two of many possible shapes of internal retainer cavity or socket shapes, allowing for a ball-joint movement of the blade.

FIG. 12 is a front section view of two of many possible shapes of internal retainer cavity shapes, namely the spherical cavity shape (31) and the conical cavity shape (41).

Figure 13:
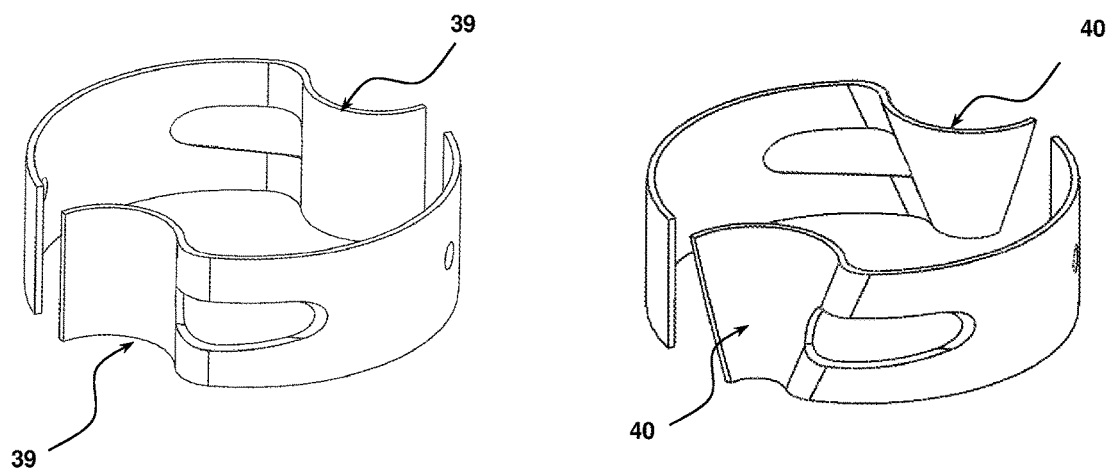
FIG. 13 is a top-right perspective view of two of many different shapes for the retainer.

FIG. 13 shows, in a top-right perspective view, two of many different shapes the retainer section of the spring-loaded retainer (5) can take, namely a cylindrical shape (39) or a conical shape (41), to correspond to the respective cavity shapes (31, 41).

Figure 14:
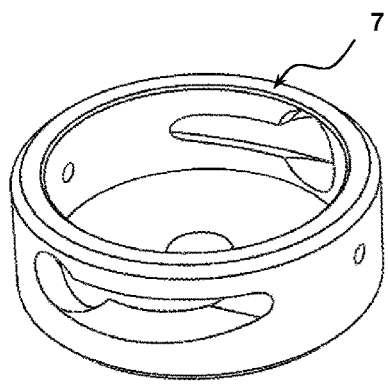
FIG. 14 is a top-right perspective view, depicting a trimmer-head cup as machined or die cast.
Figure 15:
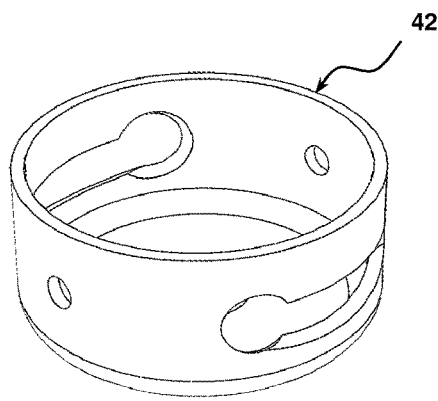
FIG. 15 is a top-right perspective view, depicting a trimmer-head cup as die-punched.
Figure 16:
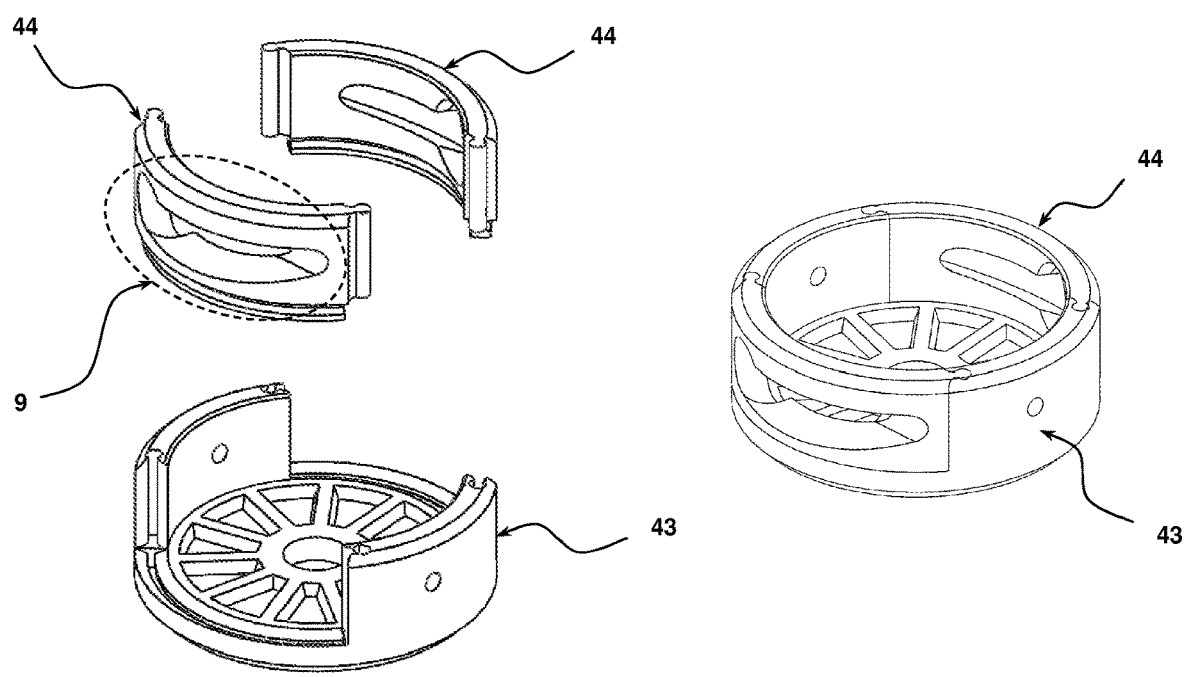
FIG. 16 is a top-right exploded and unexploded perspective view, depicting a trimmer head cup, with an injection molded head and metallic or ceramic inserts that include the blade receptacle cavity.

FIGS. 14 to 16 show top-right perspective views, with some of the possible manufacturing method results for the trimmer-head cup. FIG. 14 shows a machined or die-cast embodiment; FIG. 15 shows a die-punched embodiment (42); and FIG. 16 shows an injection molded head (43). In this last embodiment, the head (43) is provided with metallic or ceramic inserts (44) that include the blade receptacle cavity (9).

As best illustrated in FIGS. 1 through 9, the rotating trimmer head device (36) generally comprises a grass trimmer head assembly (4) and a plurality of solid metal rod blade assemblies (3), where the grass trimmer head assembly (4) is configured for coupling to a conventional weed trimmer (10) in a conventional manner such that the weed trimmer rotates the trimmer head device (36).

Trimmer head assembly (4) comprises of a trimmer-head cup (7), and a plurality of metal or any other spring material, spring-loaded retainers (5), attached in a conventional manner to the inside annular wall of the trimmer-head cup (7).

The trimmer head cup (7), is machined or die-casted out of metal, a substantially stronger material than the plastic material normally used for string-trimmer heads, or is injection molded with metal or ceramic inserts that include the blade-receptacle cavities (9) so as to withstand the heat and higher stresses occurring during operation at the root spherical portion (2) of each blade rod assembly (3).

The trimmer head cup (7) is created with a plurality of blade-receptacle cavities or sockets (9) circumferentially arranged around the, and traversing the vertical annular wall of the, trimmer-head cup (7) from the inside to the outside. Blade-receptacle cavities (9) are arranged equidistantly around the annular wall of trimmer head cup (7), so as to keep the entire trimming device (36) balanced.

Each blade-receptacle cavity (9) comprises of three distinct features; namely a machined spherical or conical cavity (31)(41) forming a socket receptacle cavity for a ball-and-socket joint where the spherical portion (2) of the blade assembly (3) will be retained, a predominantly circular opening (32) on the outside annular wall of the trimmer-head cup (7) created by the protrusion of the blade-receptacle spherical cavity (31), protruding partially further radially out, than the outer diameter of the external annular vertical wall of the trimmer-head cup (7), and an asymmetric cavity (33) machined on the external annular wall of the trimmer-head cup (7) and on the trailing side of predominantly circular opening (32), such that metal rod blade (1) can have larger rotational deflection freedom towards the rear (11) and up (15), as defined in FIG. 9.

The grass and brush trimming device (36) comprises an equivalent number of spring-loaded retainers (5) according to the number of retainer cavities (9) found on a particular embodiment of (36) of the disclosure, and each spring-loaded retainer (5) is positioned so as its mostly vertical cylindrical (39) or conical (40) retainer portion is aligned to the internal spherical receptacle cavity (31) of each blade-receptacle cavity (9), so as to spring radially inwards when the spherical portion (2) of blade assembly (3) presses against it, and allow the spherical portion (2) of blade assembly (3) to enter the cavity (31), and press against spherical portion (2) loosely, retaining the spherical portion (2) of blade assembly (3) in the retainer cavity (31).

Each spring-loaded retainer (5) is assembled on the trimmer-head cup (7) by fastening, gluing, spring loading or any other conventional manner, shown here assembled using a rivet (6) and comprises a spring portion (38) which is responsible for the spring loading action on the spherical portion (2) of blade assembly (3), and a cylindrical (39) or any other appropriate shape retainer portion (39)(40) that is the actual geometry coming in contact and restricting the free dislodgement of the spherical portion (2) of blade assembly (3) from the head assembly (4), unless acted upon by a moderate force radially inward and downward by the user on the spherical portion (2) of blade assembly (3) from the outer side of the annular wall of the grass trimmer head cup (7), so as blade assembly (3) be removed and replaced.

A metal rod blade assembly (3), comprises a solid metal rod of any cross-sectional shape (1), made of, but not limited to, a spring steel family material such as piano-wire A228, EN 10270-1, SWP-A, SWP-B or others, and a spherical attachment (2) at one end of the metal rod (1), forming the root or retained portion of blade assembly (3), and spherical attachment (2) is attached to the rod in a conventional manner such as press fitting, fastening, over-molding, or gluing, and spherical attachment (2) is made of, but not limited to, metal, ceramic or PTFE, and acting as the retainer of the blade to the grass trimmer head assembly (4), once metal rod blade assembly (3) is inserted in one of a plurality of blade-receptacle cavities (31) from the inside radially out (37), in a manner so as to be easily removed and replaced when needed.

Each of the blade-receptacle cavities (9) comprises among other features of a machined spherical or conical cavity (31)(41) on the inside vertical annular wall of the trimmer-head cup (7) which is spherical (31) or conical (41) in geometry, with a diameter slightly larger than the spherical portion (2) of the blade assembly (3), so as to accept the spherical portion (2) of the blade assembly (3) and form a universal ball-joint, and so as to allow the metal rod portion (1) of the blade assembly (3), to rotate freely, within boundaries, in the rotational degrees of freedom M(x) (13) (15) and M(y) (11)(12), while allowing unlimited angle rotation in the direction of M(z) (14), as it passes through the predominantly circular opening (32), from the inside of the trimmer-head cup (7), out (37).

Each of the blade-receptacle cavities (9) comprises among other features of an asymmetrical machined cavity (33) on the outside vertical annular wall of the trimmer-head cup (7) and on the trailing side of circular opening (32), so as to allow the metal rod portion (1) of the blade assembly (3), to rotate at higher rotational angles in the direction of −M(y) (11), with up to 115 degrees of deflection or more, and to allow the maximum deflection of 25 degrees or more in the −M(x) (15) direction of the metal rod portion (1) of the blade assembly (3), to continue at an −M(x) angle equal to 25 degrees as it traverses all 115 degrees of deflection in the −M(y) (11) direction.

Each blade-receptacle cavity (9) comprises a predominantly circular opening (32) on the outside annular wall of the trimmer-head cup (7) created by the protrusion of the blade-Receptacle spherical cavity (31) protruding partially further radially out than the outer diameter of the external vertical annular wall of the trimmer-head cup (7) among others, so as to allow the metal rod portion (1) of the blade assembly (3), to rotate at angles of up to 25 degrees in the direction of +M(y) (12), and +M(x) (13).

Trimmer head device (36) is installed on a grass or brush trimmer (10), in a conventional manner. The metal rod blade assemblies (3) are coupled to the blade-receptacle cavities (9) such that the metal rod portion (1) of the blade assemblies (3) extend from the trimmer head assembly (4) radially outwards and cut vegetation or other material as the trimmer head device (36) is rotated by the grass or brush trimmer (10).

With respect to the above description then, it is to be realized that the optimum dimensional relationships for the parts of an embodiment enabled by the disclosure, to include variations in size, angles, materials, shapes, form, function and manner of operation, manufacturing method of each part or assembly, assembly and use, are deemed readily apparent and obvious to a person skilled in the art, and all equivalent relationships to those illustrated in the drawings and described in the specification are intended to be encompassed by an embodiment of the disclosure.

Therefore, the foregoing preferred embodiment is considered as illustrative only of the principles of the disclosure. Further, since numerous modifications and changes will readily occur by those skilled in the art, it is not desired to limit the disclosure to the exact construction and operation shown and described, and accordingly, all suitable modifications and equivalents may be resorted to, falling within the scope of this disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

What is claimed is:

1. A head assembly for trimming grass and brush in a rotating manner,
the head assembly comprising:
a trimmer head, a main section of which is configured as an inverted cup with a top section in the shape of a disk and a wall section, having an annular shape, arranged around a periphery of the top section, wherein the wall section comprises at least one passage that extends through the wall section, from an origin at an internal socket on an inside of the wall section and a terminus in a predominantly circular opening on an exterior of the wall section, wherein the predominantly circular opening has additional material removed on the outer side on each of a trailing edge and a trailing upper side, as defined by an intended direction of rotation of the trimmer head;
for each opening, a corresponding blade assembly, each blade assembly comprising a single length of a solid rod, with a sphere attached to an end of the solid rod, the sphere having a diameter that is larger than a diameter of the solid rod, such that when the blade assembly is inserted through the passage from the inside of the trimmer head, the solid rod extends through and radially beyond the circular opening and the socket receives the sphere, and
a plurality of spring-loaded retainers, each retainer having a spring section and a retaining section, each retainer removably or permanently positioned in the inside of the wall section for the retaining section thereof to compress the sphere of one of the blade assemblies into the corresponding socket, using spring force from the spring section thereof.

2. The head assembly of claim 1, wherein each internal socket is spherical.

3. The head assembly of claim 1, wherein the main section comprises a metallic material.

4. The head assembly of claim 1, wherein the spring section of each retainer is connected to the inside of the wall section.

5. The head assembly of claim 4, wherein the retainer section of each retainer has a cylindrical shape.

6. The head assembly of claim 4, wherein the retainer section of each retainer has a conical shape, in which a larger diameter portion of the cone is located in a lower section of the retainer section and a smaller diameter portion is located in an upper section as the trimmer head device is mounted onto a trimmer.

7. The head assembly of claim 4, wherein both the retainer and spring section of the spring-loaded retainers are shaped out of a spring wire of any suitable spring material, wire-form.

8. The head assembly of claim 1, wherein each retainer comprises a metallic or plastic material.

9. The head assembly of claim 1, wherein each predominantly circular opening has a diameter that prevents passage of the sphere of the blade assembly therethrough.

10. The head assembly of claim 1, wherein the metal rod of each metal rod blade assembly comprises a spring steel or a piano-wire material.

11. The head assembly of claim 10, wherein the metal rod of each blade assembly is constructed with any type of cross section, either propagating straight or twisting along the line of propagation.

12. The device of claim 10, wherein the sphere of each blade assembly comprises a metallic material.

13. The device of claim 10, wherein the sphere of each blade assembly comprises a ceramic material.

14. The device of claim 10, wherein the sphere of each blade assembly comprises a plastic material.

15. A rotating trimmer head device comprising:
a trimmer head having an inverted cup main section made out of plastic and consisting of a horizontal disk top section and a vertical annular wall section;
said vertical annular wall section being structured to have a plurality of receptacles so as to accept metal or ceramic inserts;
said inserts being structured to be inserted in the receptacles of said plastic inverted cup receptacles and having a cylindrical shape and to have a single internal spherical or conical socket opening starting on the inner concave side of the insert and traversing the vertical annular wall section toward the outside and creating a predominantly circular opening on the outer convex side of said insert;
said predominantly circular opening on the outer convex side of said insert having further removed material on the outer convex side of said insert, on the trailing edge and trailing upper side, as defined by the rotational direction of the head when the insert is placed and assembled permanently or in a replaceable manner in a conventional manner in a receptacle on said plastic inverted cup;
a plurality of spring-loaded retainers, each of said retainers having a spring section and a retaining section, being positioned according to an associated one of said internal spherical or conical socket openings on insert, such that the retaining section of each retainer is located directly behind said internal spherical or conical socket openings, and such that the distance between the retaining section surface is at a smaller distance than the sphere created by said internal spherical socket opening, or the inscribed sphere created by said internal conical socket opening;
a plurality of metal rod trimmer blade assemblies, each trimmer blade having a length of a single solid rod and a sphere attached to one end of said solid metal rod, of slightly smaller diameter than the diameter of the sphere, or the inscribed sphere;
defining said internal spherical or conical socket openings on the inserts of said trimmer head and traversing the vertical annular wall section toward the outside, where said metal rod trimmer blade assemblies enter rod first in said openings from the inside out and extend radially out of the rotating trimmer head device and snap into place at the spherical or conical opening of the cavities and retained into place by the spring loaded retaining section of said retainers.

\* \* \* \* \*